United States Patent
Tsirkin

(10) Patent No.: US 10,678,583 B2
(45) Date of Patent: *Jun. 9, 2020

(54) GUEST CONTROLLED VIRTUAL DEVICE PACKET FILTERING

(71) Applicant: Red Hat Israel, Ltd., Raanana (IL)

(72) Inventor: Michael S. Tsirkin, Lexington, MA (US)

(73) Assignee: Red Hat Israel, Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,812

(22) Filed: Sep. 12, 2018

(65) Prior Publication Data

US 2019/0026143 A1 Jan. 24, 2019

Related U.S. Application Data

(63) Continuation of application No. 14/630,528, filed on Feb. 24, 2015, now Pat. No. 10,095,534.

(51) Int. Cl.
*G06F 9/455* (2018.01)

(52) U.S. Cl.
CPC ...... *G06F 9/45558* (2013.01); *G06F 9/45545* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,743,197 B2 | 6/2010 | Chavan et al. | |
| 8,014,413 B2 | 9/2011 | Cummings et al. | |
| 8,166,474 B1 | 4/2012 | Delco et al. | |
| 8,443,440 B2 | 5/2013 | McGee | |
| 8,522,238 B2 | 8/2013 | Tsirkin | |
| 8,761,187 B2 | 6/2014 | Barde | |
| 9,354,907 B1 | 5/2016 | Teli et al. | |
| 2007/0156942 A1 | 7/2007 | Gough | |
| 2010/0100718 A1 | 4/2010 | Srinivasan | |
| 2011/0225624 A1 | 9/2011 | Sawhney et al. | |
| 2013/0125124 A1 | 5/2013 | Kempf et al. | |

(Continued)

OTHER PUBLICATIONS

Alfredo Cardigliano et al., "vPf_RING: Towards Wire-Speed Network Monitoring Using Virtual Machines," IMC 11, Nov. 2-4, 2011, 16 pages, ACM, Berlin, Germany.

(Continued)

*Primary Examiner* — Tammy E Lee
(74) *Attorney, Agent, or Firm* — Lowenstein Sandler LLP

(57) ABSTRACT

Implementations are described for guest controlled virtual device packet filtering. A method of the disclosure includes receiving, at a guest operating system (OS) of a virtual machine executed by a processing device of a host machine, a notification of a host configuration change from a hypervisor of the host machine, the host configuration change affecting routing of networking packets corresponding to the virtual machine over a network, implementing, by the guest OS, configuration changes to a guest OS environment, the configuration changes corresponding to the host configuration change, and in response to implementing the configuration changes, notifying, by the virtual machine, the hypervisor that network packet filtering of the networking packets can be disabled.

18 Claims, 7 Drawing Sheets

(56) References Cited

U.S. PATENT DOCUMENTS

| | | | |
|---|---|---|---|
| 2013/0227562 A1* | 8/2013 | Tsirkin | ............... G06F 9/45558 |
| | | | 718/1 |
| 2013/0326505 A1 | 12/2013 | Shah | |
| 2016/0246632 A1 | 8/2016 | Tsirkin | |

OTHER PUBLICATIONS

Abhinav Srivastava et al., "Tamper-Resistant, Application-Aware Blocking of Malicious Network Connections," School of Computer Science, Georgia Institute of Technology, [retrieved Nov. 2014], 20 pages, Internet: <http://people.cs.vt.edu/~danfeng/courses/cs6204/sp10-papers/application-aware-blocking-raid08.pdf>.

Tzi-Cker Chiueh et al., "Stealthy Deployment and Execution of In-Guest Kernel Agents," Symantec Research Labs, [retrieved Nov. 2014], 12 pages, Internet: <http://www.blackhat.com/presentations/bh-usa-09/CONOVER/BHUSA09-Conover-SADEintoVM-PAPER.pdf>.

USPTO, Office Action for U.S. Appl. No. 14/630,528, dated Feb. 7, 2017.

USPTO, Final Office Action for U.S. Appl. No. 14/630,528, dated Jul. 31, 2017.

USPTO, Office Action for U.S. Appl. No. 14/630,528, dated Dec. 12, 2017.

USPTO, Advisory Action for U.S. Appl. No. 14/630,528, dated Oct. 13, 2017.

USPTO, Notice of Allowance for U.S. Appl. No. 14/630,528, dated Jun. 8, 2018.

\* cited by examiner

GUEST CONTROLLED VIRTUAL DEVICE PACKET FILTERING

RELATED APPLICATIONS

This application is a continuation of U.S. patent application Ser. No. 14/630,528, filed Feb. 24, 2015, which is hereby incorporated by reference in its entirety.

TECHNICAL FIELD

The present disclosure is generally related to computer systems, and more particularly, to network packet filtering in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

In a virtualized environment, multiple virtual machines can communicate over a network by sending networking packets to the host machine to be forwarded through the network. If a configuration change is made on the host machine it can be necessary for the hypervisor on the host to modify or otherwise filter incoming and/or outgoing packets from/to a particular virtual machine. This is referred to as packet filtering.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
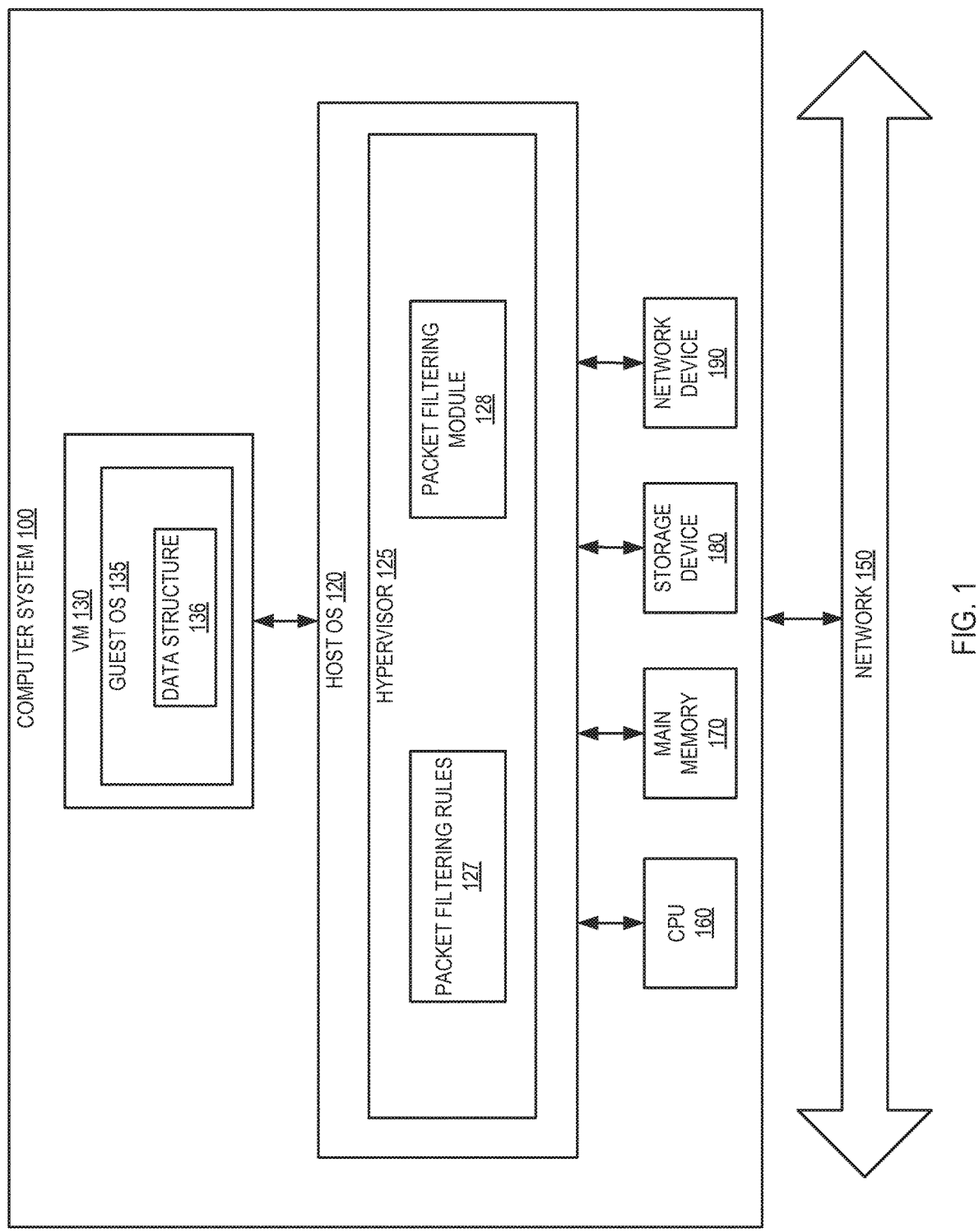
FIG. 1 depicts a high-level component diagram of an example computer system architecture, in accordance with one or more aspects of the present disclosure.

Described herein are methods and systems for guest controlled virtual device packet filtering. In a virtualized environment, multiple virtual machines can communicate over a network by sending networking packets to the host machine to be forwarded through the network. If a configuration change is made on the host machine, it can be necessary for the hypervisor on the host to modify or otherwise filter incoming and/or outgoing packets from/to a particular virtual machine. For example, when using a Network Interface Card (NIC) without software that supports Media Access Control (MAC) address translation, the host may need to modify incoming and outgoing packets in order to support a change in MAC addresses due to VM migration to a new physical NIC. This can add overhead for packet processing of both transmit and receive paths. Additionally, packet filtering is hypervisor driven and is often either enabled or disabled by an administrator for all packets transmitted through the network. This can also increase overhead since packet filtering is not commonly enabled or disabled dynamically, which can require that filtering remain on at all times whether it is needed or not. Moreover, if packet filtering has been enabled locally by a guest operating system, packet filtering by the hypervisor for that guest is a duplication of effort which can waste hypervisor resources.

Aspects of the present disclosure address the above noted deficiency by implementing dynamic packet filtering driven by the guest OS of a virtual machine. The hypervisor can notify the guest of configuration changes that may require packet filtering to be enabled. Packet filtering can remain enabled until the guest OS has completed making the corresponding configuration changes to the guest OS environment. Once the changes have been completed by the guest OS, the guest can notify the hypervisor that packet filtering is no longer required. Additionally, in implementations where packet filtering has been enabled locally by a guest operating system, the guest may send a request to the hypervisor to disable packet filtering by the hypervisor.

In an illustrative example, a hypervisor can receive a networking packet from a guest operating system of a virtual machine. In some implementations, the virtual machine may be networked with one or more additional virtual machines to which the packet may be directed. If packet filtering has previously been enabled, the hypervisor may apply packet filtering to the received packet to determine whether to forward the packet, modify the packet and forward it, or drop the packet without taking further action. In response to detecting a change to a host hardware configuration, the hypervisor may send a notification of the configuration change to the guest operating system of the virtual machine. The host hardware configuration change can be any change that may have an effect on routing the networking packet received from the guest operating system. In an illustrative example, the configuration change may be the assignment of a new host network interface controller (NIC) media access control (MAC) address. A new MAC address may be assigned due to a migration of the virtual machine to a new physical NIC. Until the guest operating system is made aware of the change in the MAC address, any packet received from the guest operating system may contain an incorrect MAC address within the packet header. Thus, filtering may be required in order to route the packet correctly.

If filtering has already been enabled, the hypervisor can filter any packet received subsequent to the change in the hardware configuration accordingly. If filtering has not been enabled, the hypervisor can enable packet filtering and filter the received packet in view of the change to the host hardware configuration. In the example above, if a new MAC address is assigned to the guest as a result of the host configuration change, the hypervisor may save the old MAC address and the new MAC address together in a set of filtering rules. The filtering rules may be stored in hypervisor memory, in a data store, or in any similar manner. If the hypervisor receives a packet from the guest with the old MAC address in the packet header, the hypervisor may access the filtering rules to determine the corresponding new MAC address, modify the packet with the new MAC address, and route the packet to its intended destination. Alternatively, the hypervisor may take no action and drop the packet rather than route it anywhere.

As noted above, the hypervisor may send a notification of the host configuration change to the guest operating system of the virtual machine. The hypervisor may send the notification via an interrupt request, a message written to a data structure in a shared memory location, or in any similar manner. The guest may subsequently receive the notification of the host configuration change and take appropriate steps to record the change. In an illustrative example, the guest operating system may update a data structure accessible to the guest with the configuration change. The data structure can be stored in a memory space, on physical disk, or the like. Once the guest has recorded the change, it may then modify any networking packets accordingly, prior to sending them to the hypervisor for routing. Additionally, the guest operating system may send a notification to each of the additional virtual machines to which it is networked (e.g., its network "neighbors") of the configuration change so that the additional virtual machines may route networking packets accordingly. The guest operating system may notify its network neighbors via, for example, an interrupt request or a message written to a data structure in a shared memory location.

Once the neighboring networked virtual machines have been notified, the guest may then send an indication to the hypervisor that the host configuration change has been recorded by the guest. In response to receiving from the guest operating system the indication that the host hardware configuration change has been recorded by the guest, the hypervisor may then disable filtering of any subsequent networking packets received from the guest. In certain implementations, the hypervisor may receive an explicit request from the guest to disable filtering. Alternatively, the hypervisor may receive the indication that the hardware configuration change has been recorded by the guest by examining the contents of subsequent packets received by the guest. For example, the hypervisor may receive networking packets from the guest and determine that the packets do not require modification in view of the predefined packet filtering rules that may have been created as a result of the configuration change. Referring to the MAC address change example described above, if the hypervisor receives a packet from the guest and determines that the packet contains the new MAC address, the hypervisor may then determine that the change has been recorded by the guest and the hypervisor need not filter any subsequent packets. The hypervisor may then disable filtering for packets from that guest.

The guest operating system may subsequently notify the hypervisor to re-enable packet filtering. In response to receiving a notification from the guest to enable filtering, the hypervisor may enable filtering for any subsequent networking packets sent by that guest. In certain implementations, the hypervisor may receive an explicit request from the guest to enable filtering. Alternatively, the hypervisor may enable filtering upon detecting a restart of the guest operating system, receiving notification that the guest has installed a new version of a driver, detecting a reset of a virtual NIC assigned to the guest, or the like.

In another illustrative example, a hypervisor can receive a networking packet from a guest operating system of a virtual machine. In some implementations, the virtual machine may be networked with one or more additional virtual machines to which the packet may be directed. If packet filtering has previously been enabled, the hypervisor may apply packet filtering to the received packet to determine whether to forward the packet, modify the packet and forward it, or drop the packet without taking further action. If filtering has not been enabled, the hypervisor can enable packet filtering and filter the received packet in view of the host hardware configuration in place. If the hypervisor receives a packet from the guest that requires modification, the hypervisor may access the filtering rules noted above and modify the packet accordingly. Alternatively, the hypervisor may take no action and drop the packet prior rather than route it anywhere.

In some implementations, the guest may detect that filtering has been enabled locally on the guest. For example, filtering may be enabled locally on the guest as an added security measure to prevent packets from unrecognized senders from being processed by the guest. The guest may detect that filtering has been enabled during startup of the guest operating system, via a notification from a component of the guest operating system in control of packet filtering, or in any other manner. The guest may send a notification to the hypervisor that host packet filtering is not required. For example, the guest may send an explicit request to the hypervisor to disable filtering on the hypervisor. In response to receiving from the guest operating system the notification that host packet filtering is not required, the hypervisor may disable filtering of any subsequent networking packets received from the guest. In certain implementations, the hypervisor may receive an explicit request from the guest to disable filtering. Alternatively, the hypervisor may receive the notification that host packet filtering is not required by examining the contents of subsequent packets received by the guest. For example, the hypervisor may receive networking packets from the guest and determine that the packets do not require modification in view of the predefined packet filtering rules that may have been previously created.

The guest operating system may subsequently notify the hypervisor to re-enable packet filtering. In response to receiving a notification from the guest to enable filtering, the hypervisor may enable filtering for any subsequent networking packets sent by that guest. In certain implementations, the hypervisor may receive an explicit request from the guest to enable filtering. Alternatively, the hypervisor may enable filtering upon detecting a restart of the guest operating system, receiving notification that the guest has installed a new version of a driver, detecting a reset of a virtual NIC assigned to the guest, or the like.

Aspects of the present disclosure are thus capable of facilitating dynamic packet filtering driven by the guest OS of a virtual machine. More particularly, aspects of the present disclosure can reduce system resource consumption required by packet filtering that remains enabled at all times.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is connected to a network 150 and comprises one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more network devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to CPU 160.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 may additionally comprise one or more virtual machine (VM) 130 and host operating system (OS) 120. VM 130 is a software implementation of a machine that executes programs as though it was an actual physical machine. Host OS 120 manages the hardware resources of the computer system and provides functions such as inter-process communication, scheduling, memory management, and so forth.

VM 130 may comprise a guest operating system (OS) 135 that handles the execution of applications within the virtual machine. Guest OS 135 may comprise data structure 136 to store configuration changes received from the host. For example, a change in the NIC MAC address made on the host may be stored in data structure 136 so that guest OS 135 may modify networking packets with the updated MAC address prior to sending to the host. Data structure 136 may be stored in a memory location within guest OS 135, a location in storage device 180, or in any similar manner. It should be noted that although, for simplicity, a single VM 130 is depicted in FIG. 1, computer system 100 may host a plurality VMs 130.

Host OS 120 may comprise a hypervisor 125, which provides a virtual operating platform for VMs 130 and manages their execution. Hypervisor 125 may comprise packet filtering rules 127 and packet filtering module 128. It should be noted that in some alternative implementations, hypervisor 125 may be external to host OS 120, rather than embedded within host OS 120, or may replace host OS 120.

Packet filtering module 128 can facilitate dynamic packet filtering for networking packets sent by VM 130 using the filtering rules stored in packet filtering rules 127, as described in detail below with respect to FIGS. 3-4. Packet filtering rules 127 can be an area of memory accessible packet filtering module 128 or a data structure saved in storage device 180.

Figure 2:
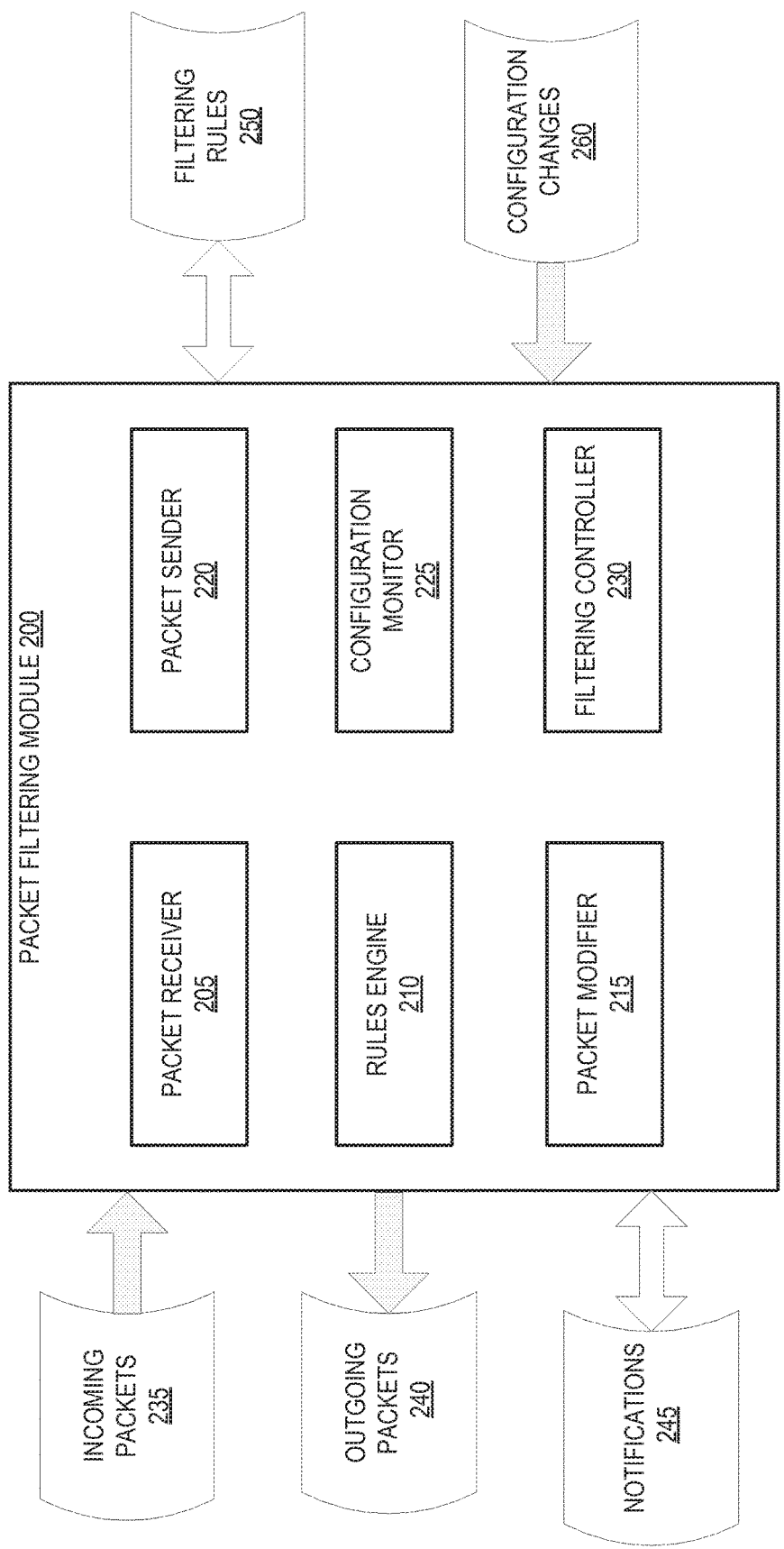
FIG. 2 depicts a block diagram of a packet filtering module, in accordance with one or more aspects of the present disclosure.

FIG. 2 depicts a block diagram of a packet filtering module, in accordance with one or more aspects of the present disclosure. As shown in FIG. 2, packet filtering module 200 can comprise a packet receiver 205, rules engine 210, packet modifier 215, packet sender 220, configuration monitor 225, and filtering controller 230. Packet filtering module 200 can receive as input incoming packets 235, filtering rules 250, configuration changes 260, and notifications 245. Packet filtering module 200 can provide as output outgoing packets 240, notifications 245, and updates to filtering rules 250. In some implementations, packet filtering module 200 can facilitate dynamic packet filtering as described above with respect to packet filtering module 128 of FIG. 1 as well as described in detail below with respect to FIGS. 3-4.

Packet receiver 205 may receive incoming packets 235 from a guest operating system of a networked virtual machine. Rules engine 210 may be invoked to apply filtering rules received from filtering rules 250 against the incoming packets 235. Configuration monitor 225 may detect host hardware configuration changes 260 and modify filtering rules 250 in view of any detected configuration changes so that incoming packets may be filtered accordingly. If configuration monitor 225 detects a configuration change, filtering controller 230 may be invoked to send notifications 245 to the guest to notify it of the configuration change. Packet modifier 215 may be invoked to apply any filtering changes to incoming packets 235 in view of received configuration changes 260. Once the packets are filtered, packet filtering module may invoke packet sender 200 to send outgoing packets 240 to their intended destination.

Once the guest has recorded the change, it may send an indication to filtering controller 230 (depicted as in-bound notifications 245). Filtering controller 230 may disable filtering for the guest based on the received indication. The indication received by filtering controller 230 may be an explicit request from the guest to disable filtering. Alternatively, filtering controller 230 may detect that the guest has recorded the configuration change by comparing the contents of incoming packets 235 to the filtering rules 250 that have been updated in view of configuration changes 260. If incoming packets 235 satisfy the conditions of filtering rules 250, subsequent filtering may be disabled. Similarly, filtering controller 230 may receive a notification from the guest (via notifications 245) to re enable packet filtering, and subsequently can enable packet filtering for any subsequent incoming packets 235 from that guest.

Figure 3:
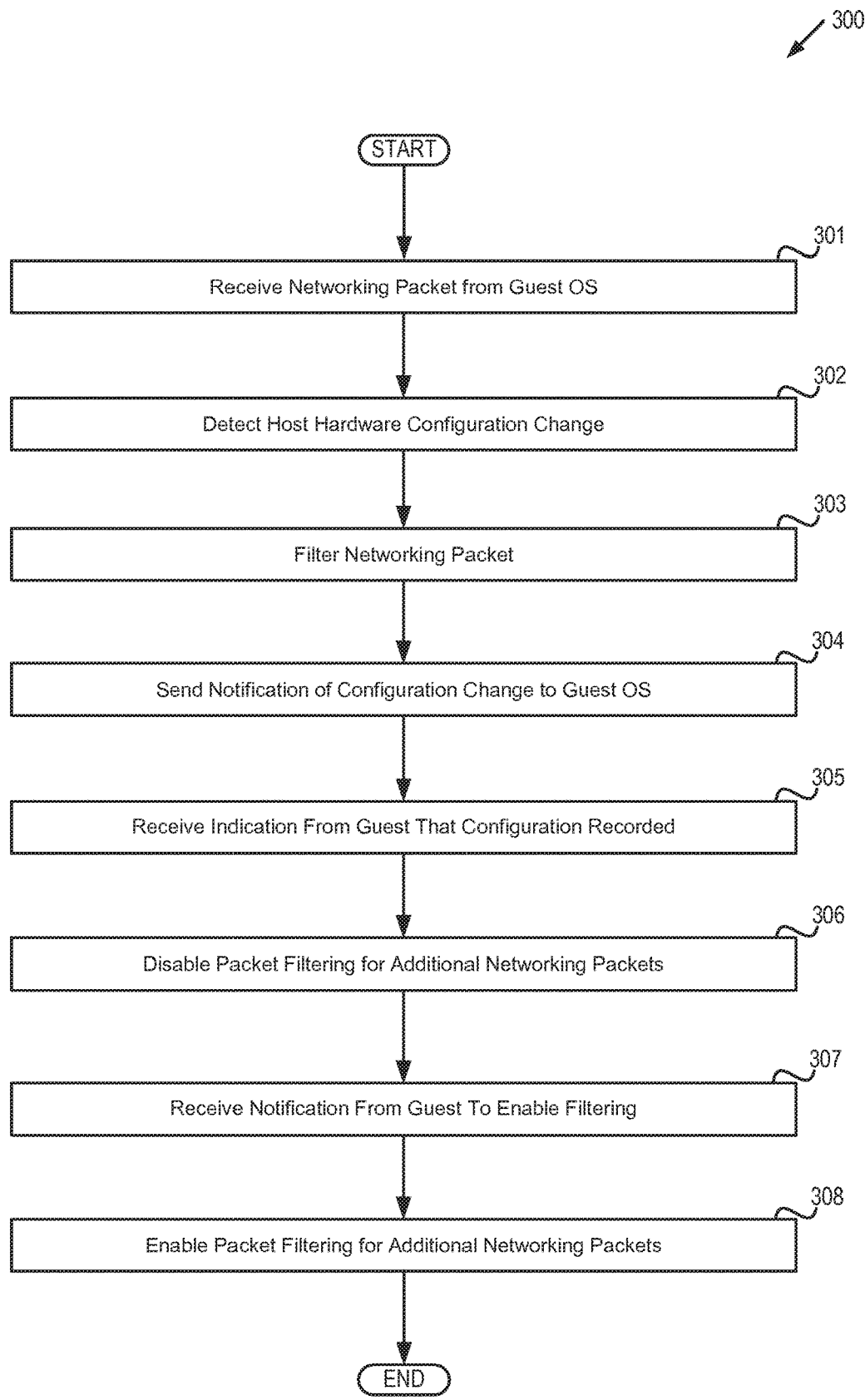
FIG. 3 depicts a flow diagram of a method for guest controlled virtual device packet filtering, in accordance with one or more aspects of the present disclosure.

FIG. 3 depicts a flow diagram of an example method 300 for guest controlled virtual device packet filtering. The method may be performed by processing logic that may comprise hardware (circuitry, dedicated logic, etc.), software (such as is run on a general purpose computer system or a dedicated machine), or a combination of both. In one illustrative example, method 300 may be performed by packet filtering module 128 of hypervisor 125 in FIG. 1. Alternatively, some or all of method 300 might be performed by another module or machine. It should be noted that blocks depicted in FIG. 3 could be performed simultaneously or in a different order than that depicted.

At block 301, processing logic can receive a networking packet from a guest operating system of a virtual machine. In some implementations, the virtual machine may be networked with one or more additional virtual machines to which the packet may be directed.

At block 302, processing logic can detect a host hardware configuration change. The host hardware configuration change can be any change that may have an effect on routing the networking packet received from the guest operating system. In an illustrative example, the configuration change may be the assignment of a new host network interface controller (NIC) media access control (MAC) address.

At block 303, processing logic can filter the received networking packet in view of the change to the host hardware configuration. If filtering has already been enabled, processing logic can filter any packet received subsequent to the change in the hardware configuration accordingly. If filtering has not been enabled, processing logic can enable packet filtering and filter the received packet in view of the change to the host hardware configuration. For example, if a new MAC address is assigned to the guest as a result of the host configuration change, processing logic may save the old MAC address and the new MAC address together in a set of filtering rules. The filtering rules may be stored in hypervisor memory, in a data store, or in any similar manner. If processing logic receives a packet from the guest with the old MAC address in the packet header, processing logic may access the filtering rules to determine the corresponding new MAC address, modify the packet with the new MAC address, and route the packet to its intended destination. Alternatively, processing logic may take no action and drop the packet prior rather than route it anywhere.

At block 304, processing logic can send a notification of the host hardware configuration change to the guest operating system of the virtual machine. Processing logic may send the notification via an interrupt request, a message written to a data structure in a shared memory location, or in any similar manner.

At block 305, processing logic can receive an indication from the guest operating system that the configuration has been recorded. In certain implementations, processing logic may receive an explicit request from the guest to disable filtering. Alternatively, processing logic may receive the indication that the hardware configuration change has been recorded by the guest by examining the contents of subsequent packets received by the guest. For example, processing logic may receive networking packets from the guest and determine that the packets do not require modification in view of the predefined packet filtering rules that may have been created as a result of the configuration change. At block 306, processing logic can disable packet filtering for any additional networking packets received from the guest operating system.

At block 307, processing logic can receive a notification from the guest operating system to re-enable packet filtering. At block 308, processing logic enables packet filtering for any additional networking packets received from the guest operating system. In certain implementations, the hypervisor may receive an explicit request from the guest to enable filtering. Alternatively, the hypervisor may enable filtering upon detecting a restart of the guest operating system, receiving notification that the guest has installed a new version of a driver, detecting a reset of a virtual NIC assigned to the guest, or the like. After block 308, the method of FIG. 3 terminates.

Figure 4:
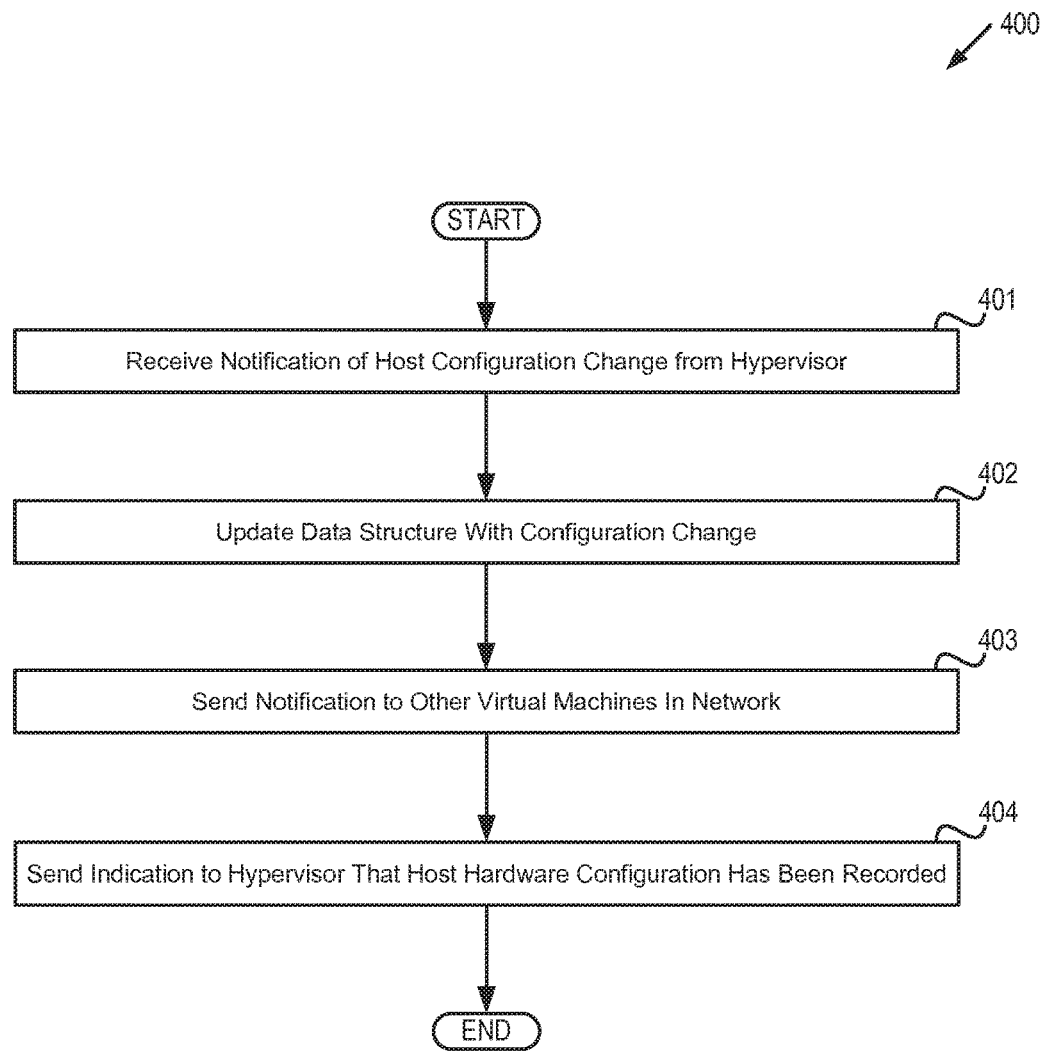
FIG. 4 depicts a flow diagram of a method for recording host configuration changes by a guest operating system, in accordance with one or more aspects of the present disclosure.

FIG. 4 depicts a flow diagram of an example method 400 for recording host configuration changes by a guest operating system. The method may be performed by processing logic that may comprise hardware (circuitry, dedicated logic, etc.), software (such as is run on a general purpose computer system or a dedicated machine), or a combination of both. In one illustrative example, method 400 may be performed by VM packet filtering module 128 of hypervisor 125 in FIG. 1. Alternatively, some or all of method 400 might be performed by another module or machine. It should be noted that blocks depicted in FIG. 4 could be performed simultaneously or in a different order than that depicted.

At block 401, processing logic can receive a notification of a host configuration change from the hypervisor. Processing logic may receive the notification via an interrupt request, a message written to a data structure in a shared memory location, or in any similar manner. At block 402, processing logic can update a data structure with the configuration change received at block 401. The data structure can be stored in a memory space, on physical disk, or the like.

At block 403, processing logic can send a notification to other virtual machines to which the guest is networked. Processing logic may notify the other virtual machines via, for example, an interrupt request or a message written to a data structure in a shared memory location. At block 404, processing logic can send an indication to the hypervisor that the host hardware configuration change has been recorded. Processing logic may send the indication by sending an explicit request to the hypervisor to disable polling. Alternatively, processing logic may update any subsequent networking packet in view of the configuration change so that the hypervisor will not need to filter it upon receipt. After block 404, the method of FIG. 4 terminates.

Figure 5:
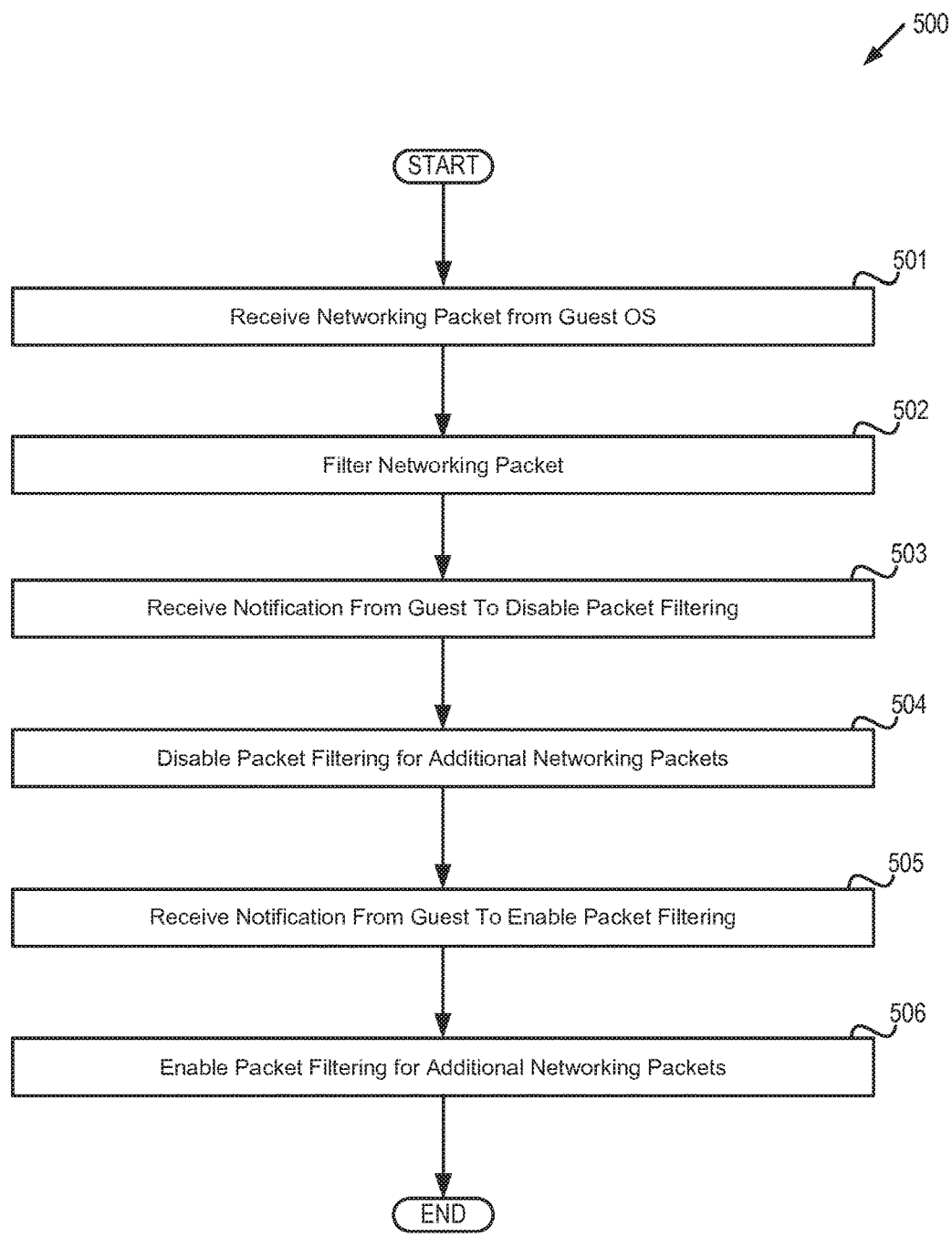
FIG. 5 depicts a flow diagram of an alternative method for guest controlled virtual device packet filtering, in accordance with one or more aspects of the present disclosure.

FIG. 5 depicts a flow diagram of an alternative example method 500 for guest controlled virtual device packet filtering. The method may be performed by processing logic that may comprise hardware (circuitry, dedicated logic, etc.), software (such as is run on a general purpose computer system or a dedicated machine), or a combination of both. In one illustrative example, method 500 may be performed by packet filtering module 128 of hypervisor 125 in FIG. 1. Alternatively, some or all of method 500 might be performed by another module or machine. It should be noted that blocks depicted in FIG. 5 could be performed simultaneously or in a different order than that depicted.

At block 501, processing logic can receive a networking packet from a guest operating system of a virtual machine. In some implementations, the virtual machine may be networked with one or more additional virtual machines to which the packet may be directed.

At block 502, processing logic can filter the received networking packet in view of the host hardware configuration. If filtering has already been enabled, processing logic can filter any packet received accordingly. If filtering has not been enabled, processing logic can enable packet filtering and filter the received packet in view of the host hardware configuration in place. If processing logic receives a packet from the guest that requires modification, processing logic may access the filtering rules and modify the packet accordingly. Alternatively, processing logic may take no action and drop the packet prior rather than route it anywhere.

At block 503, processing logic can receive a notification from the guest operating system to disable packet filtering. In certain implementations, processing logic may receive an explicit request from the guest to disable filtering. Alternatively, the hypervisor may receive the notification that host packet filtering is not required by examining the contents of subsequent packets received by the guest. For example, the hypervisor may receive networking packets from the guest and determine that the packets do not require modification in view of the predefined packet filtering rules that may have been previously created. At block 504, processing logic can disable packet filtering for any additional networking packets received from the guest operating system.

At block 505, processing logic can receive a notification from the guest operating system to re-enable packet filtering. At block 506, processing logic enables packet filtering for any additional networking packets received from the guest operating system. In certain implementations, the hypervisor may receive an explicit request from the guest to enable filtering. Alternatively, the hypervisor may enable filtering upon detecting a restart of the guest operating system, receiving notification that the guest has installed a new version of a driver, detecting a reset of a virtual NIC assigned to the guest, or the like. After block 506, the method of FIG. 5 terminates.

Figure 6:
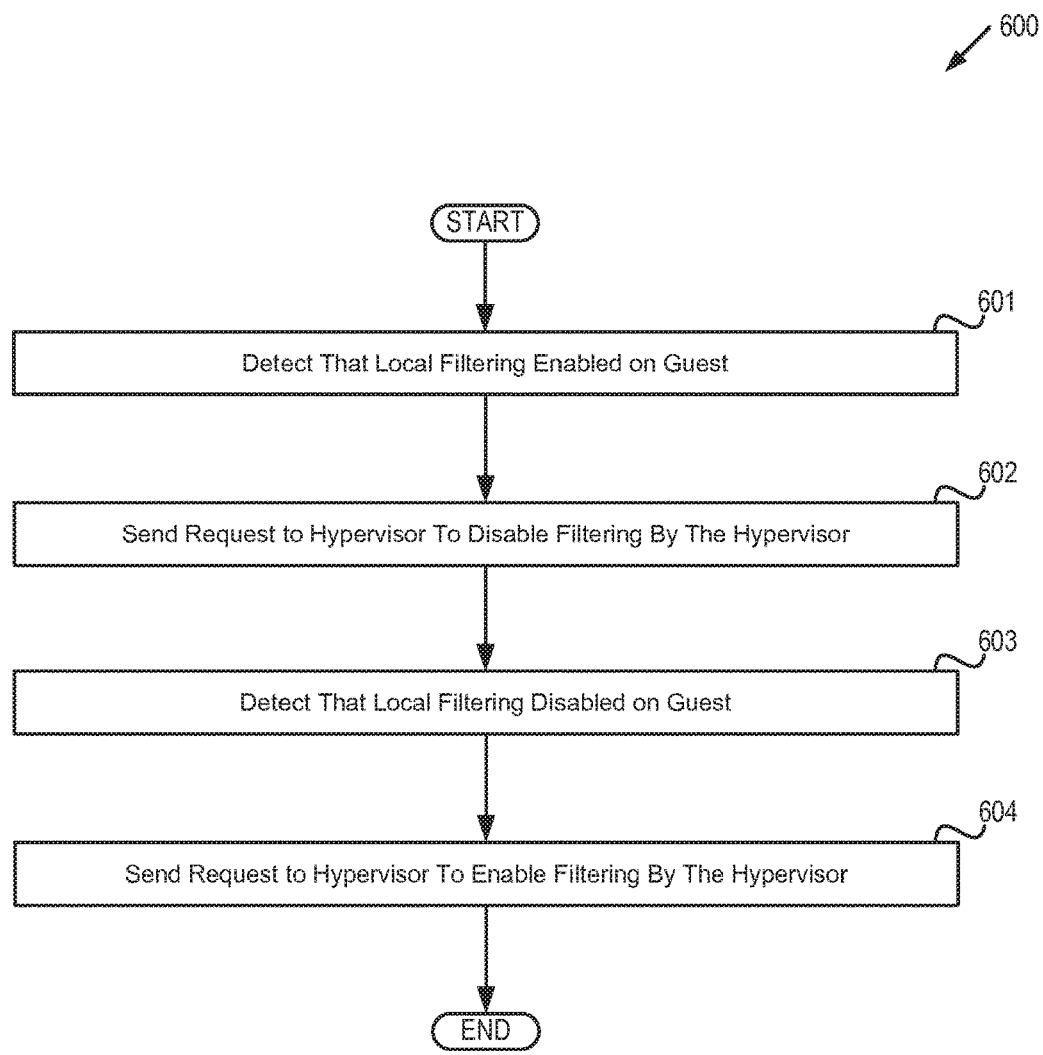
FIG. 6 depicts a flow diagram of a method for disabling host filtering by a guest operating system, in accordance with one or more aspects of the present disclosure.

FIG. 6 depicts a flow diagram of an example method 600 for method for disabling host filtering by a guest operating system. The method may be performed by processing logic that may comprise hardware (circuitry, dedicated logic, etc.), software (such as is run on a general purpose computer system or a dedicated machine), or a combination of both. In one illustrative example, method 600 may be performed by VM packet filtering module 128 of hypervisor 125 in FIG. 1. Alternatively, some or all of method 600 might be performed by another module or machine. It should be noted that blocks depicted in FIG. 6 could be performed simultaneously or in a different order than that depicted.

At block 601, processing logic can detect that local filtering has been enabled on a guest operating system of a virtual machine. For example, filtering may be enabled locally on the guest as an added security measure to prevent packets from unrecognized senders from being processed by the guest. Processing logic may detect that filtering has been enabled during startup of the guest operating system, via a notification from a component of the guest operating system in control of packet filtering, or in any other manner. At block 602, processing logic can send a notification to the hypervisor that host packet filtering is not required. For example, the guest may send an explicit request to the hypervisor to disable filtering on the hypervisor.

At block 603, processing logic can detect that local filtering has been disabled on the guest. Processing logic may detect that filtering has been disabled as a result of an error condition encountered during local packet filtering, via a notification from a component of the guest operating system in control of packet filtering, or in any other manner. At block 604, processing logic can send a notification to the hypervisor to re-enable packet filtering. For example, processing logic may send an explicit request to the hypervisor to enable filtering by the hypervisor. Alternatively, processing logic may send a notification to the hypervisor that the guest operating system is resetting or restarting, indicating that packet filtering should be enabled. After block 604, the method of FIG. 6 terminates.

Figure 7:
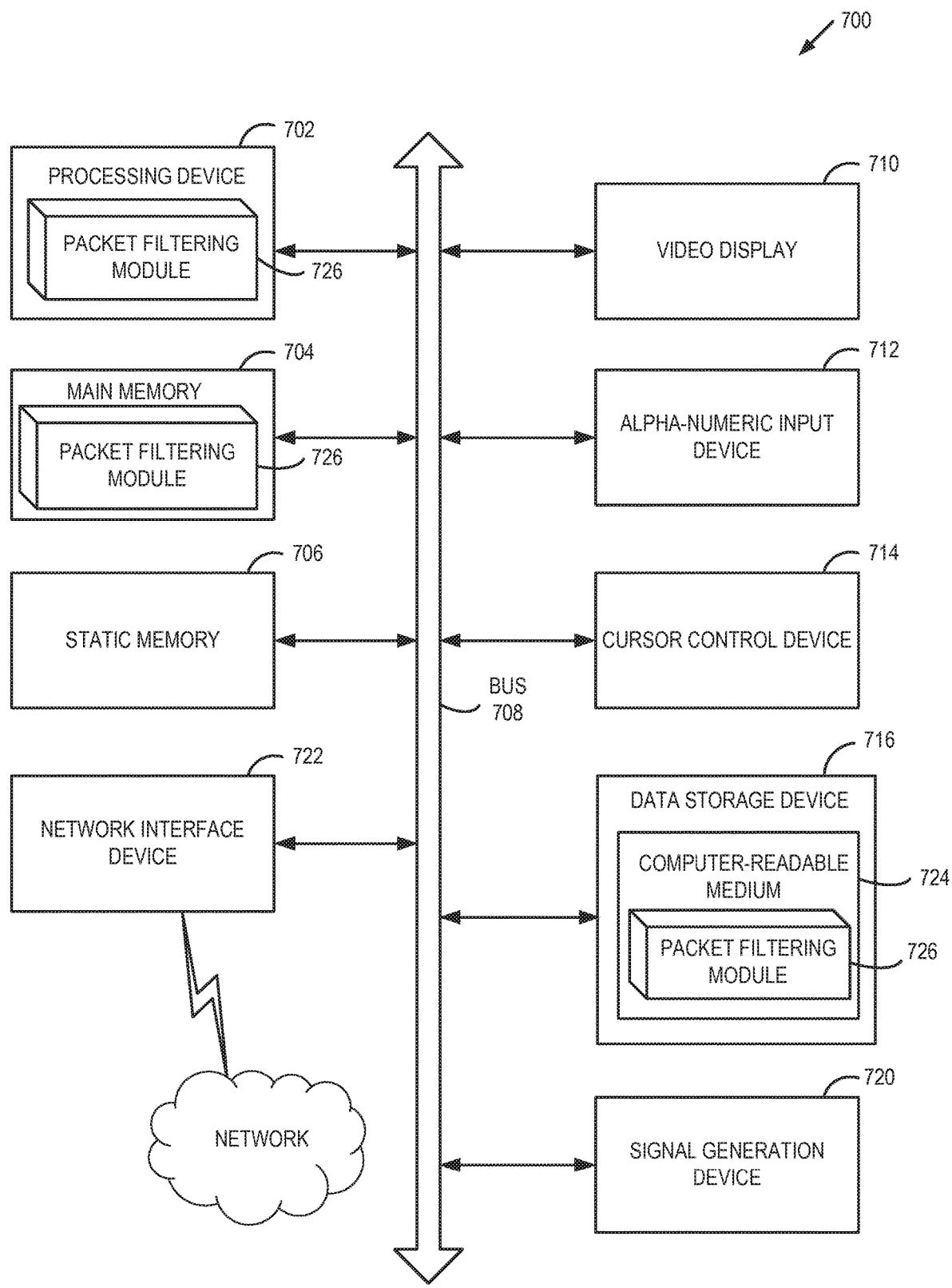
FIG. 7 depicts a block diagram of an illustrative computer system operating in accordance with examples of the invention.

FIG. 7 depicts an example computer system 700 which can perform any one or more of the methods described herein. In one example, computer system 700 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute packet filtering module 726 for performing the operations and steps discussed herein (e.g., corresponding to the methods of FIGS. 3-6, etc.).

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker). In one illustrative example, the video display unit 710, the alphanumeric input device 712, and the cursor control device 714 may be combined into a single component or device (e.g., an LCD touch screen).

The data storage device 716 may include a computer-readable medium 724 on which is stored packet filtering module 726 (e.g., corresponding to the methods of FIGS. 3-6, etc.) embodying any one or more of the methodologies or functions described herein. Packet filtering module 726 may also reside, completely or at least partially, within the main memory 704 and/or within the processing device 702 during execution thereof by the computer system 700, the main memory 704 and the processing device 702 also constituting computer-readable media. Packet filtering module 726 may further be transmitted or received over a network via the network interface device 722.

While the computer-readable storage medium 724 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "sending," "filtering," "enabling," "disabling," "determining," "notifying," "updating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving, at a guest operating system (OS) of a virtual machine executed by a processing device of a host machine, a notification of a host configuration change from a hypervisor of the host machine, the host configuration change affecting routing of networking packets corresponding to the virtual machine over a network;
   implementing, by the guest OS, configuration changes to a guest OS environment, the configuration changes corresponding to the host configuration change; and
   detecting that network packet filtering of the networking packets is enabled locally at the virtual machine; and
   in response to implementing the configuration changes and detecting that the network filtering of the networking packets is enabled locally, notifying, by the virtual machine, the hypervisor to disable the network packet filtering of the networking packets at the hypervisor.

2. The method of claim 1, further comprising sending, by the virtual machine, the notification to other virtual machines in the network.

3. The method of claim 1, wherein implementing the configuration changes further comprises updating a data structure of the virtual machine to reflect the host configuration change.

4. The method of claim 1, wherein notifying the hypervisor further comprises sending a request to the hypervisor to disable the network packet filtering at the hypervisor.

5. The method of claim 1, further comprising notifying the hypervisor to enable filtering of one or more additional networking packets from the guest operating system.

6. The method of claim 5, wherein notifying the hypervisor to enable filtering further comprises at least one of sending a request from the virtual machine to enable filtering, restarting the guest operating system, sending a notification that the guest OS has installed a new version of a driver, or resetting a virtual Network Interface Card (NIC) assigned to the guest OS.

7. The method of claim 1, wherein the host configuration change comprises a new host Network Interface Card (NIC) Media Access Control (MAC) address due to a migration of the virtual machine to a new physical NIC.

8. The method of claim 1, wherein the hypervisor to determine, subsequent to the guest OS implementing the configuration changes at the virtual machine, that one or more of the networking packets do not require modification in view of a predefined filtering rule.

9. A computing apparatus comprising:
a memory; and
a processing device, operatively coupled to the memory, to execute a virtual machine to:
receive, at a guest operating system (OS) of the virtual machine, a notification of a host configuration change from a hypervisor of the host machine, the host configuration change affecting routing of networking packets corresponding to the virtual machine over a network;
implement configuration changes to a guest OS environment of the virtual machine, the configuration changes corresponding to the host configuration change; and
detect that network packet filtering of the networking packets is enabled locally at the virtual machine; and
in response to implementing the configuration changes and detecting that the network filtering is enabled locally, notify the hypervisor to disable network packet filtering of the networking packets at the hypervisor.

10. The apparatus of claim 9, wherein the virtual machine is further to send the notification to other virtual machines in the network.

11. The apparatus of claim 9, wherein the virtual machine to implement the configuration changes further comprises the virtual machine to update a data structure of the virtual machine to reflect the host configuration change.

12. The apparatus of claim 9, wherein the virtual machine to notify the hypervisor that network packet filtering of the networking packets can be disabled further comprises the virtual machine to send a request to the hypervisor to disable the network packet filtering at the hypervisor.

13. The apparatus of claim 9, wherein the virtual machine is further to notify the hypervisor to enable filtering of one or more additional networking packets from the guest operating system.

14. A non-transitory computer readable storage medium, having instructions stored therein, which when executed by a processing device of a computer system, cause the processing device to:
receive, at a guest operating system (OS) of a virtual machine executed by the processing device, a notification of a host configuration change from a hypervisor executed by the processing device, the host configuration change affecting routing of networking packets corresponding to the virtual machine over a network;
implement configuration changes to a guest OS environment of the virtual machine, the configuration changes corresponding to the host configuration change; and
detect that network packet filtering of the networking packets is enabled locally at the virtual machine; and
in response to implementing the configuration changes and detecting that the network filtering of the networking packets is enabled locally, notify the hypervisor to disable the network packet filtering of the networking packets at the hypervisor.

15. The non-transitory computer readable storage medium of claim 14, wherein the virtual machine is further to send the notification to other virtual machines in the network.

16. The non-transitory computer readable storage medium of claim 14, wherein the virtual machine to implement the configuration changes further comprises the virtual machine to update a data structure of the virtual machine to reflect the host configuration change.

17. The non-transitory computer readable storage medium of claim 14, wherein the virtual machine to notify the hypervisor that network packet filtering of the networking packets can be disabled further comprises the virtual machine to send a request to the hypervisor to disable the network packet filtering at the hypervisor.

18. The non-transitory computer readable storage medium of claim 14, wherein the virtual machine is further to notify the hypervisor to enable filtering of one or more additional networking packets from the guest operating system.

* * * * *

UNITED STATES PATENT AND TRADEMARK OFFICE
CERTIFICATE OF CORRECTION

PATENT NO. : 10,678,583 B2
APPLICATION NO. : 16/128812
DATED : June 9, 2020
INVENTOR(S) : Michael S. Tsirkin Page 1 of 1

It is certified that error appears in the above-identified patent and that said Letters Patent is hereby corrected as shown below:

In the Claims

In Claim 9, Column 13, Line 46, after "filtering" insert --of the networking packets--

In Claim 9, Column 13, Line 47, after "disable" insert --the--

Signed and Sealed this
Twenty-second Day of September, 2020

Andrei Iancu
*Director of the United States Patent and Trademark Office*